United States Patent [19]
Bales et al.

[11] Patent Number: 5,841,780
[45] Date of Patent: Nov. 24, 1998

[54] ISDN BRI LINK RESTORATION WITHOUT LOSS OF CALLS

[75] Inventors: Bruce M. Bales, Louisville; Forrest L. Coleman, Denver, both of Colo.

[73] Assignee: Lucent Technologies Inc., Murray Hill, N.J.

[21] Appl. No.: 705,373

[22] Filed: Aug. 29, 1996

[51] Int. Cl.⁶ ............................................. H04M 3/42
[52] U.S. Cl. .................... 370/524; 370/469; 370/217; 379/245
[58] Field of Search ........................... 370/524, 463, 370/522, 469, 217, 264, 271; 379/242, 258, 220, 221, 245

[56] References Cited

U.S. PATENT DOCUMENTS

| | | | |
|---|---|---|---|
| 5,157,660 | 10/1992 | Kuwahara et al. | 370/314 |
| 5,305,312 | 4/1994 | Fornek et al. | 370/264 |
| 5,386,466 | 1/1995 | Bales et al. | 379/220 |
| 5,548,710 | 8/1996 | Oono et al. | 395/181 |
| 5,566,236 | 10/1996 | MeLampy | 379/201 |
| 5,590,127 | 12/1996 | Bales et al. | 370/260 |
| 5,754,526 | 5/1998 | Kaneko et al. | 370/217 |

*Primary Examiner*—Chi H. Pham
*Assistant Examiner*—W. Todd Baker
*Attorney, Agent, or Firm*—John C. Moran

[57] ABSTRACT

Determining by a telecommunication switching systems in response to the initialization of a new BRI interface if a communication terminal connected to the new BRI interface is presently active on another BRI interface within the telecommunication switching system. If the answer is yes, then the telecommunication switching systems automatically transfers all active calls to the new BRI interface from the other BRI interface preventing the loss of the active calls.

10 Claims, 5 Drawing Sheets

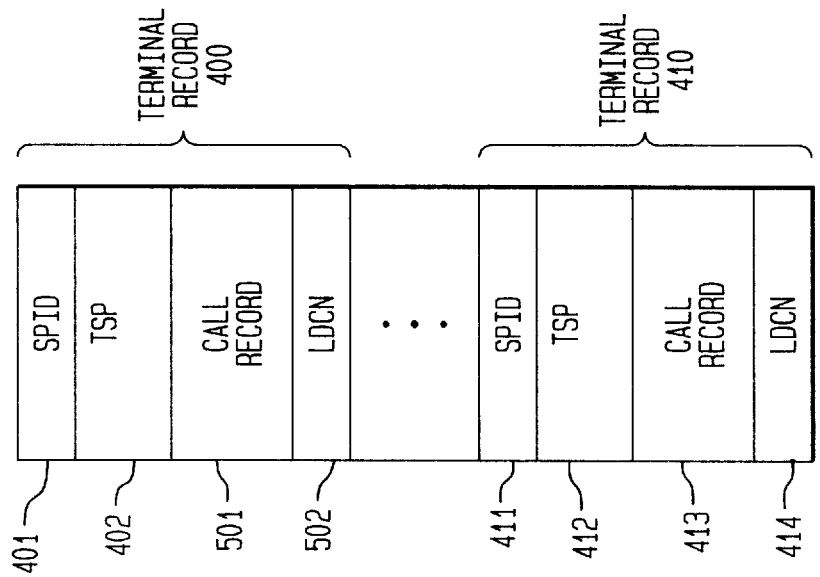
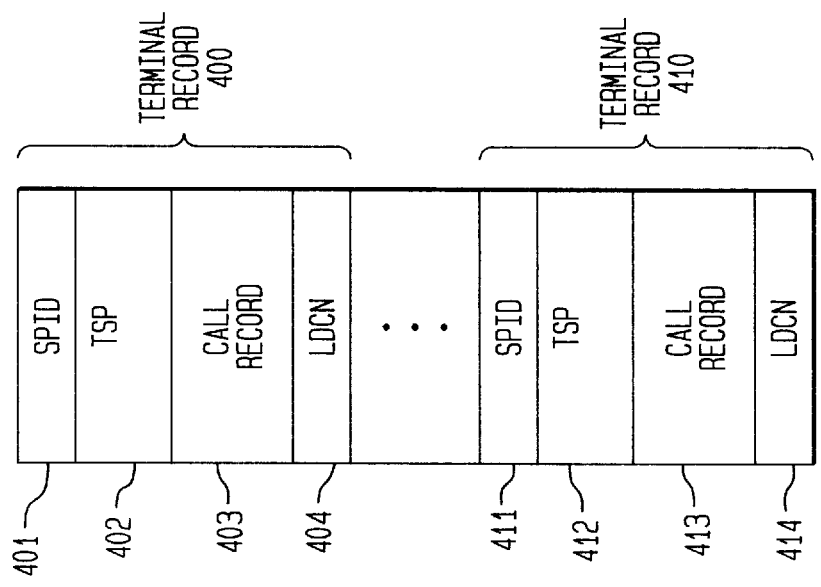

ISDN BRI LINK RESTORATION WITHOUT LOSS OF CALLS

TECHNICAL FIELD

This invention relates to telecommunication switching systems having communication terminals interconnected to a telecommunication switching systems via ISDN basic rate interfaces (BRI) within the telecommunication switching systems, and in particular, to the capability of interchanging BRI interfaces for a communication terminal without loss of an active call to the communication terminal.

BACKGROUND OF THE INVENTION

In prior art telecommunication switching systems, communication terminals are interconnected to the telecommunication switching systems via BRI links which are connected to BRI interfaces within the telecommunication switching systems. In normal administration of an installed telecommunication switching systems, it is necessary to change the BRI interfaces to which the communication terminals are connected from time to time. In prior art systems in order to make such a change, the craftsperson has to wait until a BRI communication terminal is idle resulting in large amounts of time being wasted. In addition, complex procedures must be programmed into the telecommunications switching node to busy-out the BRI communication terminal when it becomes idle; and then, the telecommunication switching systems has to inform the craftsperson that the BRI communication terminal is now busied-out. Only then, can the craftsperson proceed to connect the BRI link of the communication terminal to another BRI interface within the telecommunication switching systems. A highly distributed prior art telecommunication switching systems such as disclosed in U.S. Pat. No. 5,386,466 has a large number of individual switch nodes with each switch node handling a relatively small number of BRI links. Because of this characteristic of the telecommunication switching systems of the latter patent, the number of rearrangements of BRI interfaces increases.

Within the prior art, there is a clear need for a procedure which will allow the connection of a BRI link to another BRI interface without losing an active call on a communication terminal attached to the BRI link.

SUMMARY OF THE INVENTION

The following problem is solved, and a technical advance is achieved by an apparatus and method in a telecommunication switching systems in which the telecommunication switching systems is responsive to the initialization of a new BRI interface to determine if a communication terminal connected to the new BRI interface is presently active on another BRI interface within the telecommunication switching system. If the answer is yes, then the telecommunication switching systems automatically transfers all active calls to the new BRI interface from the other BRI interface preventing the loss of the active calls.

Other and further aspects of the present invention will become apparent during the course of the following description and by reference to the accompanying drawing.

BRIEF DESCRIPTION OF THE DRAWING

FIGS. 4 and 5 illustrate terminal records; and

DETAILED DESCRIPTION

Figure 1:
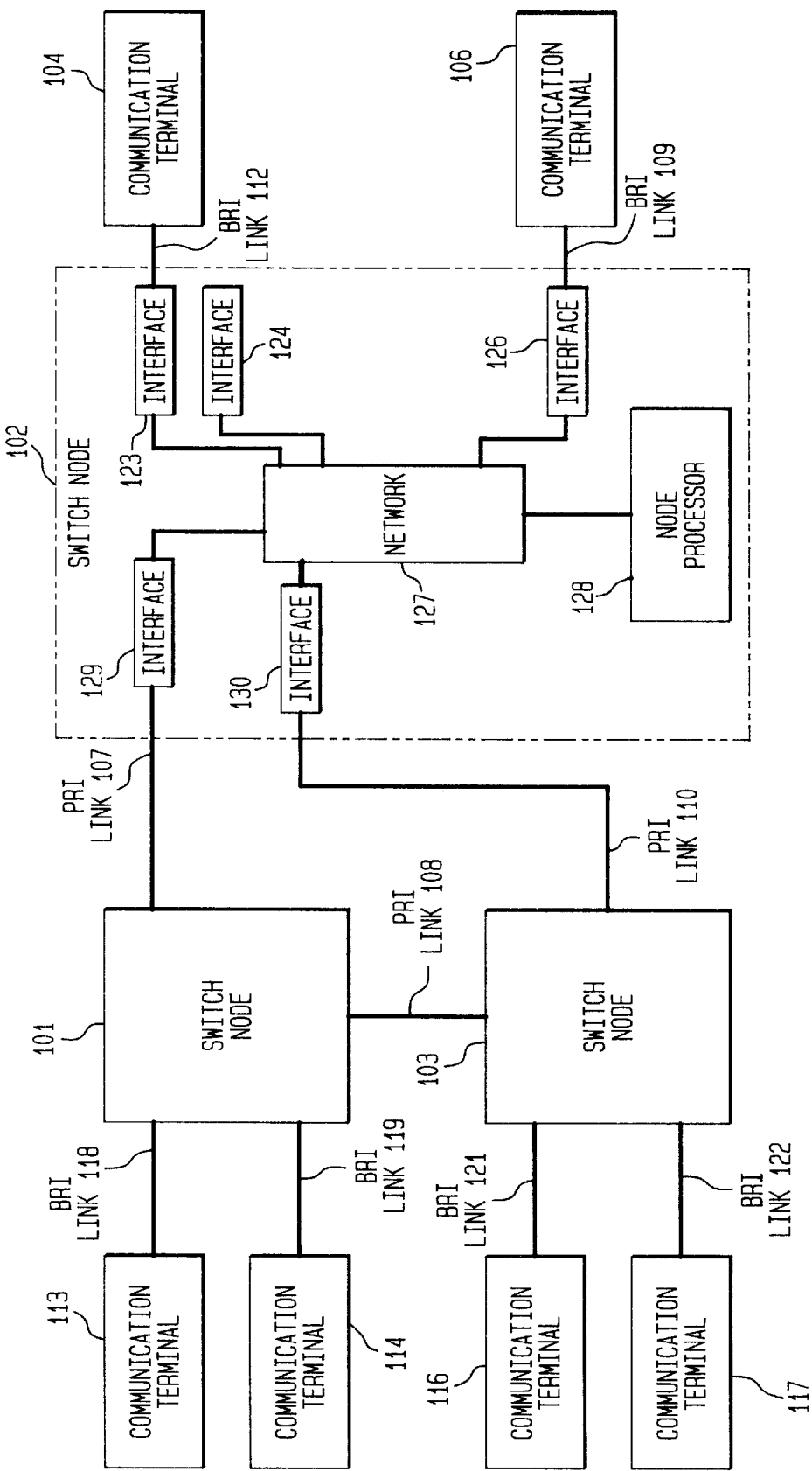
FIG. 1 illustrates, in block diagram form, a telecommunication switching systems embodying the inventive concept.

FIG. 1 shows a telecommunication switching systems having a plurality of switch nodes 101, 102, and 103. Advantageously, the switch nodes of FIG. 1 function as an integrated system to provide telecommunication services such as those provided by an individual or a network of AT&T Definity Generic 2 communication systems. As illustrated in FIG. 1, the telecommunication switching systems has communication terminals 104, 106, and 113–117 interconnected to the switch nodes 101–103 via BRI links 109, 112 and 118–202. The switch node then provides connections between the communication terminals utilizing internal switching networks and interconnection to other switch nodes via PRI links 107, 108, and 110. The communication terminals may be BRI stations sets or other BRI communication terminals such as facsimile machines, computers, or data modems. Each BRI link is connected to a switch node via an internal interface within the switch node. For example, BRI links 109 and 112 are connected to switch node 102 via interfaces 126 and 123, respectively. Greater detail on switch node 102 is set forth in FIG. 3. Switch node 102 is controlled by node processor 128. Various voice and signaling paths are set up through network 127 under control of node processor 128. In addition, node processor 128 controls interfaces 123, 124, 126, 127, 129 and 130. Interfaces 129 and 130 interface PRI links 107 and 110 to switch node 102, respectively.

To further understand the inventive concept, consider the following example. Communication terminal 104 is engaged in an active call or a signaling procedure with communication terminal 113 via BRI link 118, switch node 101, PRI link 107, interface 129 and network 127 when a craftsperson unplugs BRI link 112 from interface 123 and reconnects BRI link 112 into interface 124. As long as the reconnection occurs within 90 seconds so as to avoid the typical time-out as dictated by the ISDN protocol, the active call in which communication terminal 104 is engaged will not be terminated. If communication terminal 104 is a BRI station set, the user of the station set will have the conversation interrupted for the period of time that it takes the craftsperson to reconnect BRI link 112 to interface 124. If communication terminal 104 is a facsimile machine or a data modem, then an error will occur but the information will be retransmitted so as to recover from the error condition. This capability allows the craftsperson to rearrange interfaces without being concerned with whether a communication terminal is engaged in an active call.

Figure 3:
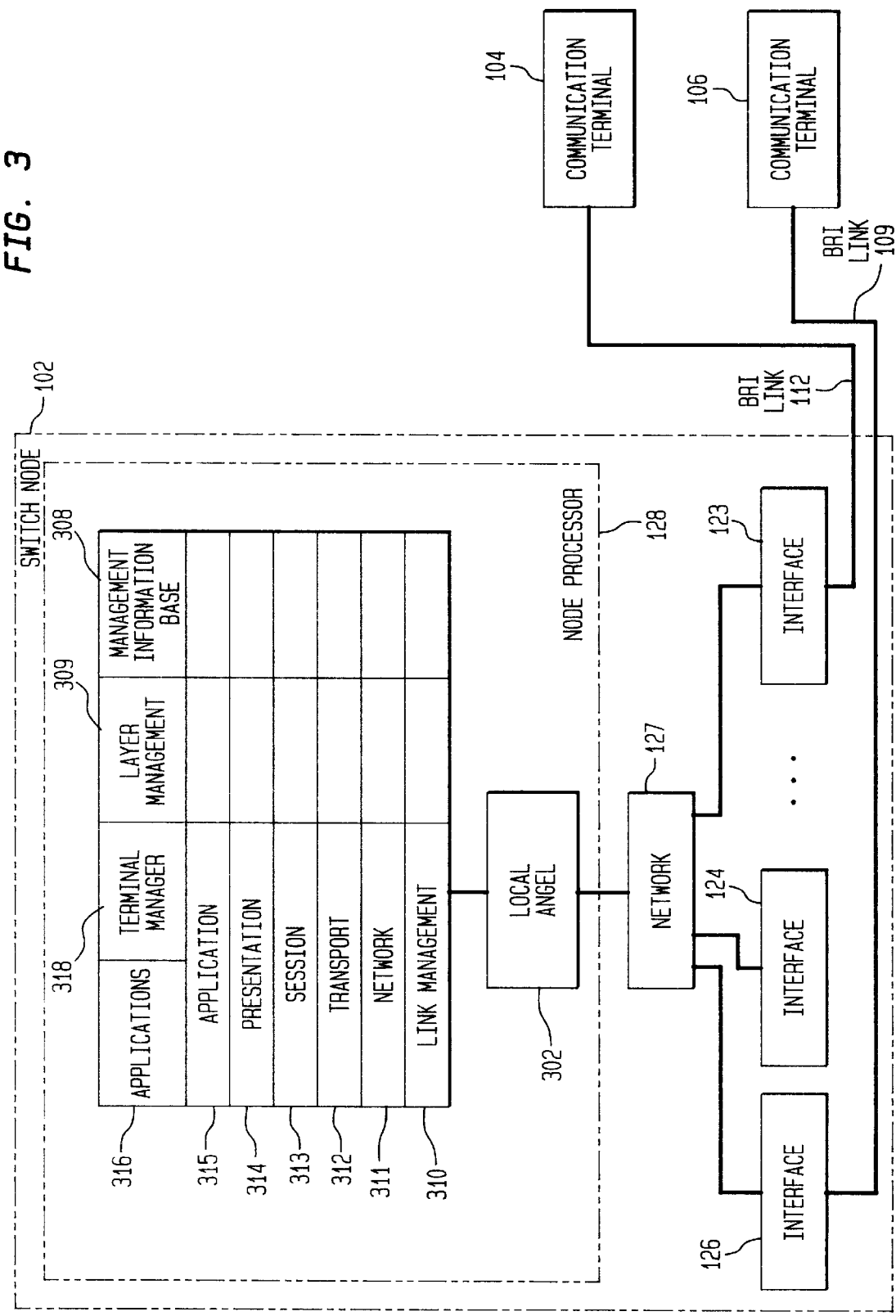
FIG. 3 illustrates, in block diagram form, greater detail of a switch node of the telecommunication switching systems of FIG. 1.

As described with respect to FIG. 3, when BRI link 112 is connected to interface 124, interface 124 begins an initialization process which is described in greater detail in U.S. Pat. No. 5,386,466 which is hereby incorporated by reference. Node processor 128 via network 127 is responsive to the initialization of interface 124 to request the service profile ID (SPID) from communication terminal 104. The SPID uniquely identifies communication terminal 104. Node processor 128 then examines an internal table to determine if communication terminal 104 is presently assigned to another interface. In the present example, node processor 128 determines that communication terminal 104 is assigned to interface 123 and is active on a call. Node processor 128 is responsive to this information to reconnect the call from interface 129 via network 127 to interface 124 instead of interface 123.

Figure 2:
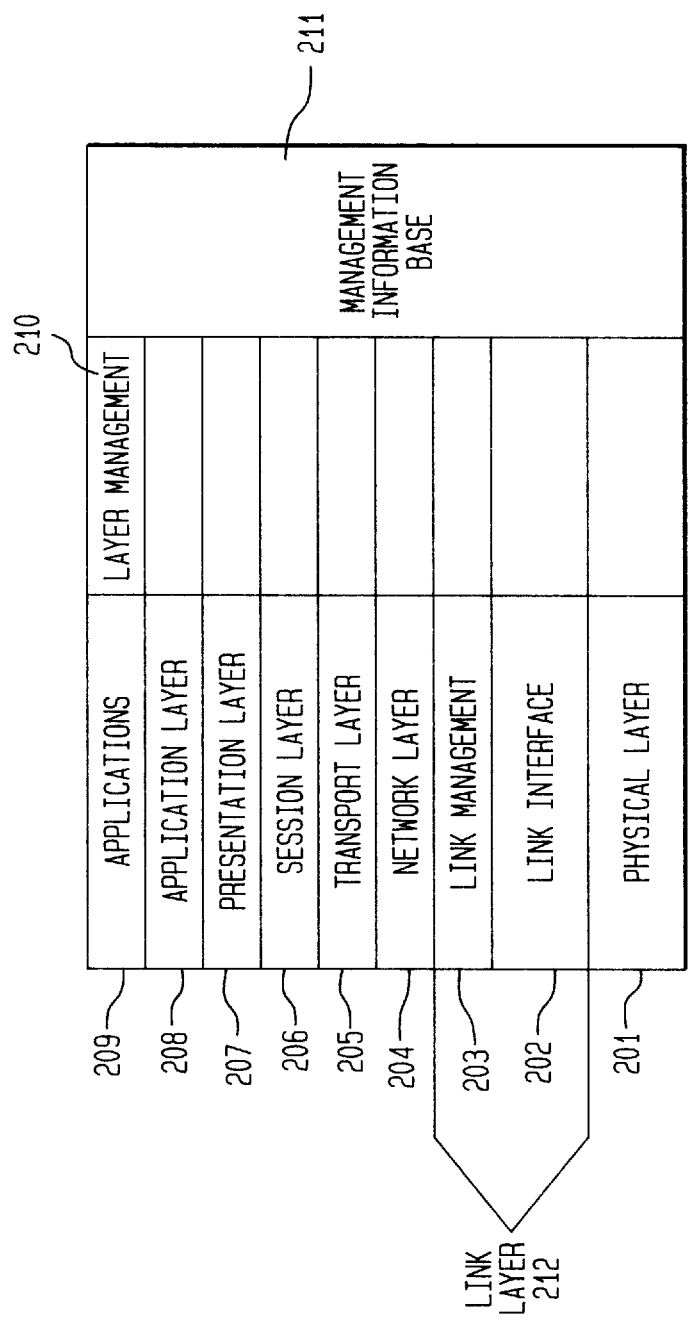
FIG. 2 illustrates a software architecture in accordance with the invention.

FIG. 2 illustrates the software architecture of the switch nodes of FIG. 1. This architecture is based on the conventional OSI model modified to implement the ISDN protocol. Further modifications have been made to this model to incorporate the invention. Software layers 205 through 209 are described in U.S. Pat. 5,386,466.

The principal function of physical layer 201 is to terminate physical links. Specifically, physical layer 201 is responsive for maintaining physical channels and for controlling physical sub-channels thereon. Physical layer 201 comprises a software portion and physical interfaces. Further, the software portion of physical layer 201 is responsible for the direct control of the physical interface to which physical links communicate PRI and BRI information terminate. Physical layer 201 presents to link layer 212 physical sub-channels and physical channel as entities controllable by link layer 212.

The primary function of link layer 212 is to assure that the information transmitted over a physical channel is recovered intact and in the correct order. This is accomplished using another layer of protocol (referred to as the physical packet protocol) which allows multiple communications paths— commonly referred to as logical links—to be established on a given physical channel or a physical sub-channel communicating packetized data. These logical links are used to identify and process data being communicated between layer 212 and physical layer 201. In ISDN Q.921, the protocol used is the LAPD packet protocol. Further, link layer 212 allows higher software layers to control physical layer 201 in an abstract manner. Link layer 212 uses a first layer of software protocol.

As seen in FIG. 2, link layer 212 is divided into link interface 202 and link management 203. The reason for this division is set forth herein below. It will 10 be helpful at this point to discuss the communication of ISDN signals over a D channel to help readers who have only a rudimentary knowledge of the communication of ISDN signals over a D channel. At link layer 212, a plurality of logical links is established on a D channel. Only one of these logical links communicates ISDN control signals, and this logical link is referred to as a logical D channel (LDC). The LDC is identified by a logical D channel number (LDCN).

Link interface 202 does the majority of the functions performed by link layer 212, including the establishment of logical links. Link management 203 identifies the various link interfaces for higher software layers. Further, link management 203 communicates information between the logical links and higher software layers.

Network layer 204 processes information communicated on the LDCs and terminates the ISDN Q.931 protocol. Hence, this layer is responsible for negotiating the utilization of system resources for the termination or origination of calls external to a switching node. The network layer controls the allocation of channels on an interface on which a call is being received or set up. Greater detail on the manner in which network software layer 204 functions with respect to setting up calls is set forth in U.S. Pat. No. 5,386,466.

FIG. 3 illustrates, in block diagram form, the software architecture of FIG. 2 as implemented in switch node 102. Software layers 203 through 209 are implemented on the main processor of switch node 102 which is node processor 128. Specifically, the software layers down through the link management portion of the link layer are realized by software layers denoted as 316 through 310 in node processor 128. The link interface portion of the link layer is implemented by a software module node in processor 128 designated as local angel 302.

The physical layer is jointly implemented by hardware and software. Specifically, the hardware portion of the physical layer for switch node 102 is implemented by interfaces 123, 124, 126, 129 and 130. The software portion of the physical layer is performed by local angel 302. Interfaces 129 and 130 are not illustrated in FIG. 3.

In FIG. 3, communication terminal 104 may advantageously be an AT&T ISDN 7506 station set or a wireless base station. In addition, one skilled in the art could readily see that terminal manager 318 could be another type of software application. Returning to the previous example, when BRI link 112 is disconnected from interface 123 and reconnected into interface 124, interface 124 in conjunction with elements 302–311 commences the low level initialization as described in U.S. Pat. No. 5,386,466. After the low level initialization is completed, a new logical connection is established between communication terminal 104 and terminal manager 318. This new logical connection is identified with a new LDCN number. Terminal manager 318 requests the service profile ID (SPID). After receiving the SPID from communication terminal 104, terminal manager 318 then scans through the table of terminal records illustrated in FIG. 4 looking for a SPID entry such as SPID 401 which matches the SPID received from the communication terminal 104. FIG. 4 illustrates the state of terminal records before BRI link 112 was disconnected from interface 123. Assuming that SPID 401 is identical to the SPID received from communication terminal 104 and call record 403 indicates an active call, terminal manager 318 updates terminal record 400 to reflect the fact that BRI link 112 is no longer connected to interface 123. LDCN 404 was associated with the connection via interface 123. In addition, call record 403 contained information identifying interface 123. The new LDCN number associated with the connection via interface 124 is LDCN 502. Terminal manager 318 updates terminal record 400 to reflect the fact that the LDCN number is now LDCN 502. Call record 501 also reflects the fact that the call is now via interface 124. After updating terminal record 400, terminal manager 318 requests that the lower software layer 313 through 302 establish a connection from interface 124 to interface 129 using LDCN 501 of terminal record 400.

If there is no entry in call record 403 indicating an active call, no connection is made through network 127. However, terminal record 400 is still updated to indicate the interface to which communication terminal 104 is connected as illustrated in FIG. 5. The manner in which software layers 313 through 302 process calls with respect to the LDCN is set forth in U.S. patent application Ser. No. 08/451282, entitled "Adjustment of Call Bandwidth During a Communication Call", filed May 26, 1995, and assigned to the same assignee as the present application. U.S. Pat. Ser. No. 08/451282 is hereby incorporated by reference.

Figure 6:
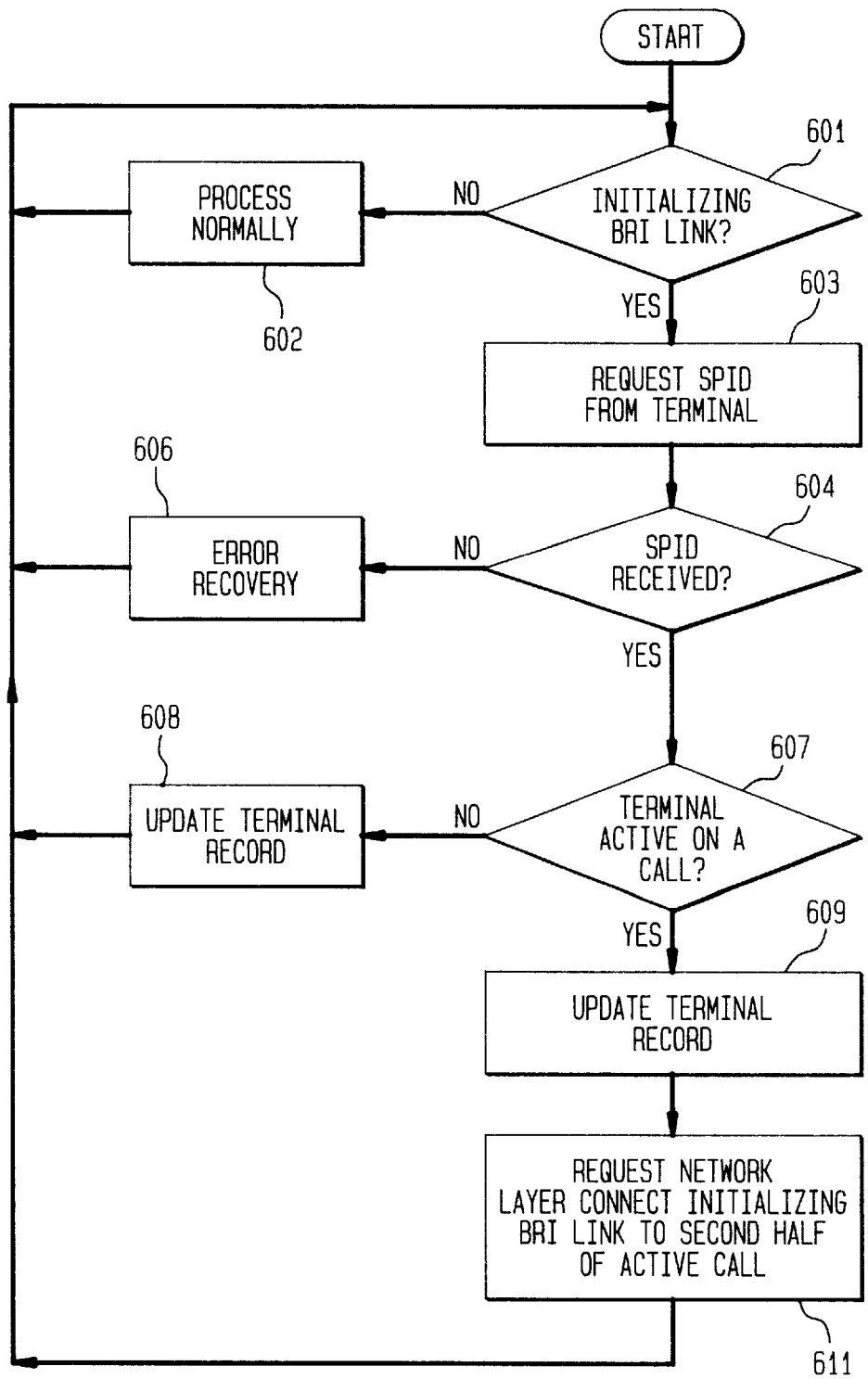
FIG. 6 illustrates, in flow chart form, steps performed by an application program.

FIG. 6 illustrates the operations performed by terminal manager 318. Decision block 601 determines if a BRI link is initializing. If the answer is no, block 602 performs normal processing. If the answer in decision block 601 is yes, block 603 requests the SPID from the terminal connected on the initializing BRI link. Decision block 604 determines if a SPID was received. If the answer is no, block 606 does error recovery. Note, that after blocks 602 and 606 are done processing, they return control to decision block 601.

If the SPID was received from the terminal, decision block 607 examines the call record associated with the terminal record to determine if the terminal is active on a call. If the answer is no, 608 updates the terminal record to reflect that the terminal is now connected to the system via the initializing BRI link before returning control to decision block 601. If the answer in decision block 607 is yes, block 609 updates the terminal record to include the new LDCN number by replacing the existing LDCN number that was associated with the interface to which the initializing BRI link had previously been connected. In addition, block 609 updates the call record of terminal record 400 as is illustrated by call record 501. Also in FIG. 5, the new LDCN is denoted LDCN 502 of terminal record 400. After execution of block 609, block 611 requests that the network layer connect the initializing BRI link to the second half of the active call reflected in call record 501. The second half of the call is in the present example terminates on interface 129. After execution of block 611, control is transferred back to decision block 601.

It is to be understood that the above-described embodiment is merely illustrative of the principles of the invention and that other arrangements maybe devised by those skilled in the art without departing from the spirit or scope of the invention. In particular, more than one communication terminal could be connected to each BRI link.

The invention claimed is:

1. A method of allowing the rearrangement of communication links connecting communication terminals to a telecommunication switching system while maintaining active telecommunication calls with the communication terminals, comprising the steps of:

detecting an initialization of a communication terminal on a first telecommunication interface of the telecommunication switching system;

requesting terminal identification information from the communication terminal;

receiving the terminal identification information from the communication terminal;

comparing the received terminal identification information with stored information to determine if the communication terminal is active on a telecommunication call on a second telecommunication interface of the telecommunication switching system; and connecting the telecommunication call to the first telecommunication interface upon the communication terminal being engaged in an active telecommunication call whereby the active telecommunication call is maintained to the communication terminal.

2. The method of claim 1 wherein the step of comparing comprises the steps of maintaining a record for each of the active communication terminals; and storing in each record call information identifying the active call.

3. The method of claim 2 wherein the step of connecting comprises the step of accessing the record for the communication terminal to obtain the identification of the active call.

4. The method of claim 1 wherein the communication terminal is a telephone station set.

5. The method of claim 1 wherein the communication terminal is a wireless base station.

6. An apparatus of allowing the rearrangement of communication links connecting communication terminals to a telecommunication switching system while maintaining active telecommunication calls with the communication terminals, comprising:

means for detecting an initialization of a communication terminal on a first telecommunication interface of the telecommunication switching system;

means for requesting terminal identification information from the communication terminal;

means for receiving the terminal identification information from the communication terminal;

means for comparing the received terminal identification information with stored information to determine if the communication terminal is active on a telecommunication call on a second telecommunication interface of the telecommunication switching system; and means for connecting the telecommunication call to the first telecommunication interface upon the communication terminal being engaged in an active telecommunication call whereby the active telecommunication call is maintained to the communication terminal.

7. The apparatus of claim 6 wherein the means for comparing comprises means for maintaining a record for each of the active communication terminals; and means for storing in each record call information identifying the active call.

8. The apparatus of claim 7 wherein the means for connecting comprises means for accessing the record for the communication terminal to obtain the identification of the active call.

9. The apparatus of claim 6 wherein the communication terminal is a telephone station set.

10. The apparatus of claim 6 wherein the communication terminal is a wireless base station.

* * * * *